April 18, 1950     J. F. SCHNEIDER ET AL     2,504,459
CRANBERRY HARVESTER
Filed Oct. 14, 1944     2 Sheets-Sheet 1
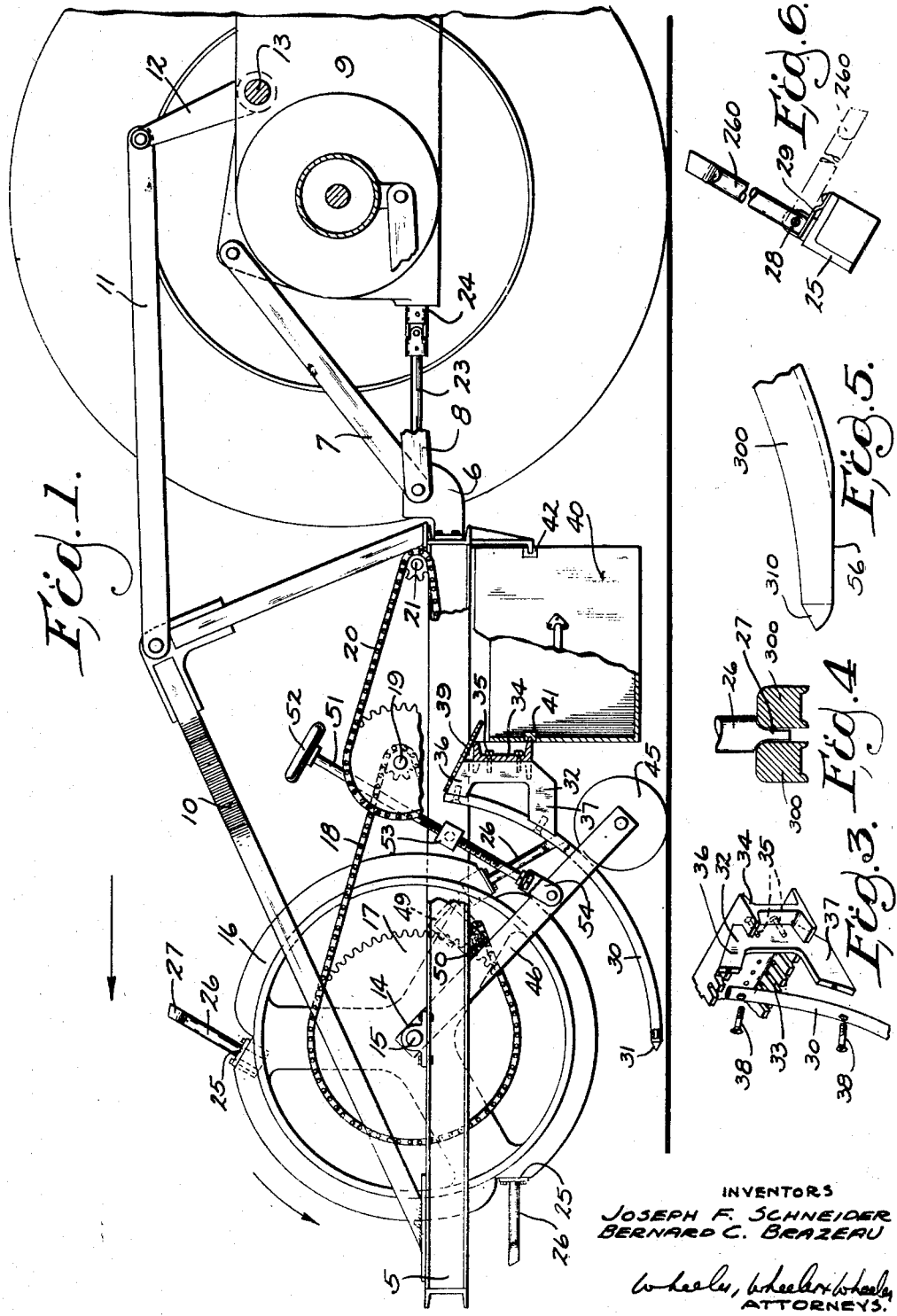
INVENTORS
JOSEPH F. SCHNEIDER
BERNARD C. BRAZEAU
Wheeler, Wheeler & Wheeler
ATTORNEYS.

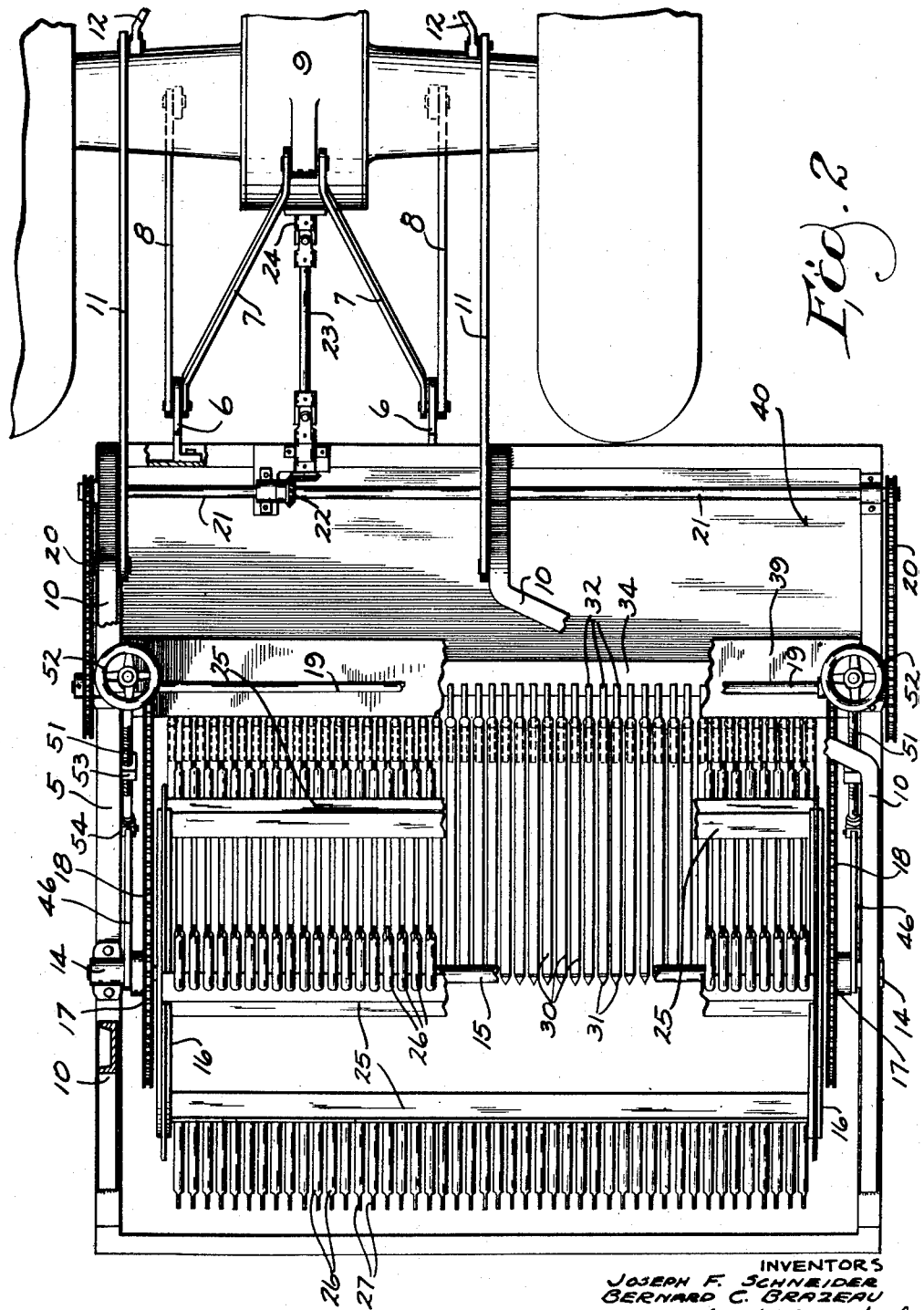

Patented Apr. 18, 1950

2,504,459

UNITED STATES PATENT OFFICE 2,504,459

CRANBERRY HARVESTER

Joseph F. Schneider, Port Edwards, and Bernard C. Brazeau, Wisconsin Rapids, Wis.; said Brazeau assignor to Central Cranberry Company, Wisconsin Rapids, Wis., a corporation of Wisconsin Application October 14, 1944, Serial No. 558,646

19 Claims. (Cl. 56—330)

This invention relates to improvements in cranberry harvesters.

It is the primary object of the invention to provide a successful machine for harvesting the cranberries. To this end, the objectives of the invention include a novel form and mounting of the harvesting bars, the bars being arcuate and individually mounted to provide clearance throughout their length for the vines; a reel provided with comb teeth interacting in a novel manner with the harvesting teeth or bars and to the axis of which the harvesting bars are concentric; a novel mounting for a stripping roll whereby such roll is yieldably movable arcuately above the axis of the reel concentric with the arc of the several harvesting bars to maintain a fixed spacing therefrom in all positions of the roller.

Other objects of the invention will be apparent to those skilled in the art upon analysis of the following disclosure.

In the drawings:

Fig. 1 is a view of our improved harvester as it appears largely in side elevation, with parts broken away to expose parts which would otherwise be concealed.

Fig. 2 is a plan view of the apparatus shown in Fig. 1, with parts broken away to expose underlying construction.

Fig. 3 is a fragmentary detail view in perspective showing the mounting of an individual harvester bar.

Fig. 4 is a view in transverse section through a modified type of harvesting bar.

Fig. 5 is a fragmentary detail in side elevation of the modified harvesting bar shown in section in Fig. 4.

Fig. 6 is a fragmentary detail in transverse section through a comb element showing in side elevation a modified comb tooth mounting.

To avoid complication, we have illustrated our cranberry harvester as a tractor attachment instead of showing it as a self-propelled vehicle. As a tractor attachment, it has certain advantages in that the existing mechanism of the tractor may be used to lift the operating parts of the harvester free of the earth for transportation.

The harvester comprises a frame 5 having ears at 6 connected by links 7 and 8 with the tractor generally indicated at 9. Upstanding portions 10 of the frame are connected by links 11 with the arms 12 of the hydraulically operated rock shaft 13 with which this type of tractor is provided. Thus, the entire frame 5 may, by oscillation of rock shaft 13 in a clockwise direction, as viewed in Fig. 1, be lifted so that the harvesting mechanism hereinafter described will clear the ground for transportation.

The frame is provided with bearings at 14 for a shaft 15 upon which a reel 16 is rotatably mounted. Sprockets 17 are connected by chains 18 with pinions on jack shaft 19. This shaft, in turn, is connected by chains 20 with shaft 21 driven by bevel gearing 22 and shaft 23 from the power takeoff 24 of tractor 9.

The reel 16 is provided at intervals with transverse supports 25 upon which comb teeth 26 are mounted in mutually spaced relation. These teeth may conveniently be made of wood. They are preferably round in cross section and flattened at 27 at their respective ends. The flattened surfaces are parallel to the planes in which the respective teeth rotate on reel 16. The teeth are preferably so disposed as to project obliquely rearwardly with reference to the direction of rotation of the reel (which is counter-clockwise as viewed in Fig. 1). The oblique rearward inclination of the teeth assists in enabling them to hold the berries to the harvesting bars with which the teeth cooperate as will hereinafter be explained.

The comb teeth may optionally be pivoted in the respective combs, as indicated in Fig. 6 where the comb tooth 26a is oscillatable about the pin 28, normally being held erect in its operative position by the flat spring 29 acting against the flat end of the tooth. In the event an obstacle is encountered by a given tooth, such tooth will oscillate about its pivot against the initial bias of the spring and will ultimately snap to the horizontal position indicated in dotted lines, from which it may be reset by the operator when the obstruction is cleared.

The harvesting bars 30 are arcuately curved concentrically about the axis of reel shaft 15. As shown in Fig. 3, the bars are made out of tubular stock and provided with inserted points 31. C-shaped mounting plates 32 for the individual bars are set into slots 33 in the upper and lower flanges of an I-beam 34 which transversely spans the frame 5. Bolts 35 through the web of the I-beam anchor the respective plates and to the end portions 36 and 37 of each plate the respective harvesting bars 30 are attached by countersunk screws 38. Thus there is no cross connection between the respective harvesting bars except through the I-beam spaced well to the rear thereof. This arrangement eliminates all possibility of vines or leaves thereof becoming wedged between the bars. All the material passing upwardly along the bars can readily clear at the tops of the bars, without obstruction.

Instead of making the bars tubular, we may make them of channel stock, as exemplified in Figs. 4 and 5 at 300. There is less likelihood of berries wedging between bars when the bars are only slightly rounded and are otherwise of generally rectangular outline in section. Whether or not the bar is made of channel stock, its pointed end 310 may, if desired, be brought closer to the bed by flattening its lower surface at 56.

The bars are so located on the I-beam that the flattened end portions 37 and comb teeth 26 register with the spaces between bars. Since the bars are concentric with the axis about which the comb teeth operate, the respective teeth move uniformly between the respective bars from end to end, delivering over the top ends of the bars all the material caught therebetween.

Any desired arrangement may be made for catching the delivered berries. By way of a simple illustration, we provide at 39 a baffle leading from the tops of the harvesting bars 30 rearwardly at a downward inclination to a box 40 which slides like a drawer on the guide flanges 41, 42.

When the berries caught between the harvesting bars are propelled arcuately upwardly between the bars by the comb teeth 26, it is desirable to hold the vines lest they be pulled from the soil. For this purpose, we employ a roller at 45 (Fig. 1), the ends of which are rotatably supported by arms 46 pivotally supported by the reel shaft 15. Since the arc of the harvesting bars 30 is concentric with the axis of shaft 15, it will be apparent that in the rising annd falling movements of roller 45, the roller must necessarily maintain uniform spacing at the rear of the bars 30. The roller, riding on the vines, holds the vines down while the berries are propelled upwardly along the arcuately curved bars by the comb teeth 26. Thus the berries are stripped from the vines without uprooting the vines. This arrangement of the roller has been found important to the desired results.

In order to hold the roller firmly to the bed traversed by the machine, we may provide mounting devices 49 on the frame, supporting rubber blocks 50 engaged by the arms 46 to yieldably limit the upward movement of roller 45. If it is desirable to limit the range of movement of arms 46, we may also employ adjusting screws at 51 operated by hand wheels 52 and threaded through nuts 53 pivoted to the frame, the screws having swiveled clevises 54 loosely coupling the screws to the arms 46 of roller 45. The coupling may permit the rollers sufficient range of movement to enable them to be acted upon resiliently by the blocks 50, while the screws and clevises nevertheless prevent the roller from moving too far out of position when the frame is lifted for transportation.

The tractor axle and wheels illustrated happen to be the rear axle and wheels of a conventional tractor. Consequently, in order to operate our harvesting appliance to the left, as viewed in Fig. 1, it is necessary that the tractor be operated in reverse. This has proved to be entirely satisfactory in practice. The harvester frame is so offset respecting the tractor (see Fig. 2) that at least one of the tractor wheels is located directly behind the harvester where it operates on vines that have already been stripped of their berries. The other wheel is located at the side in an area over which the harvester is assumed to have operated in the course of a previous traverse.

The rate of reel rotation is such that its periphery has approximately the same rate of linear travel as the travel of the harvester over the ground. Consequently, the comb teeth 26 are not moving appreciably with respect to the vines which they encounter. The harvesting bars are close to the surface of the bed and their pointed ends lift the vines and catch the berries. The comb teeth, in effect, hold the vines stationary as the harvester advances. Thus the forward movement of the harvester simply lifts the berries from the bed while ultimately the vines are held beneath the roller as the berries are stripped from the vines. The continued curvature of the bars is such that the comb teeth finally are lifting the berries almost vertically toward the baffle 39 over which they fall on to any desired means provided for catching them, the box 40 being an example.

While the harvesting bars 30 respectively extend arcuately for approximately 90 degrees from their substantially horizontal points to their almost vertical top ends, it will be observed that the pointed end 31 has the effect of turning upwardly the extreme leading end of each bar. This assists in allowing the bars to clear minor obstructions and tends to cause the bars to flex upwardly, rather than backwardly, when such obstructions are encountered.

In actual practise, the harvesting device has been found successful in that it harvests cranberries many times more rapidly and with less injury to the vines than in the case of hand harvesting.

We claim:

1. A harvester of the character described comprising the combination with a supporting frame, a transverse reel shaft on the frame, and a reel mounted on the shaft and provided with comb teeth having laterally spaced extremities, of a receiving receptacle carried by said frame and having its upper margin behind said shaft, a transverse frame member adjacent said margin, a series of mutually spaced forwardly projecting arms carried by said frame member, laterally spaced harvesting bars each mounted individually upon an arm, the respective bars having forwardly projecting ends beneath the shaft and extending rearwardly and upwardly from said ends substantially concentrically with said shaft and between the extremities of the comb teeth to a delivery point adjacent the margin of said receptacle, the spacing of said harvesting bars affording continuously open channels through which the extremities of the comb teeth pass from the forwardly projecting ends of said arms to the point at which delivery into said receptacle is effected, and driving connections for rotating the reel in a direction to cause the comb teeth to move through said channels from the ends of said bars to said point.

2. The device of claim 1 in which the comb teeth on the reel are rearwardly inclined with respect to the direction of reel rotation.

3. A harvesting device of the character described comprising a set of harvesting bars having end portions immediately above ground level and extending thence rearwardly and upwardly in an arc, said bars being mutually spaced and provided with independent supports whereby the spacing between bars is continuous throughout their length, a vehicle frame on which said bar supports are mounted for advance in the direction toward which the lower ends of said bars project, a reel mounted for rotation upon an axis transverse respecting said frame, the arc of the respective harvesting bars being substantially concentric with said axis, means for rotating said reel in the course of advance of the frame in a direction such that the top of the reel moves in the direction of such advance, and at least one set of comb teeth mounted on the reel and spaced and terminally shaped to fit between adjacent bars to move rearwardly and upwardly from the forward ends of said bars in the course of reel rotation.

4. The device of claim 3 in which said comb teeth have a rearward inclination with respect to the direction of reel rotation.

5. The device of claim 3 in which the respective comb teeth have reduced and flattened terminal portions substantially fitting between the respective bars, said teeth, immediately above said portions, overlying the respective bars between which said terminal portions extend.

6. A harvesting device of the character described comprising the combination with a supporting frame, of a transverse frame member provided with spaced forwardly directed supports, and a set of harvesting bars in mutually spaced relation, each mounted individually intermediate its ends on one of said supports whereby the respective bars provide unobstructed channels between them and between said supports.

7. The structure defined in claim 6 in which said bars are each arcuately formed and extend from said supports downwardly and forwardly to terminal portions at least approximately horizontal.

8. The device of claim 6 in which the supports for said bars comprise plates and the transverse frame member is provided with notches into which the respective plates are set.

9. The device of claim 6 in which the supports for said bars comprise plates and the transverse frame member is provided with notches into which the respective plates are set, each of said plates having forwardly directed portions at different levels with which the bars are respectively connected.

10. A harvesting machine of the character described comprising the combination with a reel and means for supporting the reel for rotation, at least one set of comb teeth carried by the reel, of a set of harvesting bars of arcuate form substantially concentric with the reel and mutually spaced to strip the harvested crop from the vegetation upon which it grows, the comb teeth coacting with said bars to advance the harvested crop arcuately along the bars, and means acting on the vegetation to preclude its being uprooted during the harvesting operation, said means comprising a roller disposed immediately behind said bars, and means holding said roller at substantially uniform spacing behind said bars while accommodating some upward and downward movement thereof, said means comprising roller supports pivoted concentrically with said reel.

11. In a harvester of the character described, the combination with arcuately curved harvesting bars in mutually spaced relation, said bars having forwardly directed terminal ends and extending thence rearwardly and upwardly for stripping the harvested crop from its vegetation, of arms pivoted for movement in an arc concentric with the arc of said bars, and a roller mounted on said arms behind said bars and at approximately uniform spacing from said bars during movement of said roller pivotally on said arms.

12. The device of claim 11 in further combination with means acting on said arms for the positioning of said roller.

13. The device of claim 11 in further combination with means acting on said arms for the positioning of said roller, said means comprising resiliently yieldable members biasing said roller downwardly and forwardly about the pivot of said arms.

14. The device of claim 11 in further combination with means acting on said arms for the positioning of said roller, said means comprising adjusting screws limiting the movement of said arms at least in an upward direction.

15. A harvesting machine of the character described comprising the combination with a machine frame and receiving means for the harvested crop, of a transverse frame member disposed immediately forwardly of said receiving means and provided with a baffle for guiding the harvested crop to the receiving means, arms projecting forwardly from the transverse frame member in mutually spaced relation, harvesting bars of arcuate form connected near their upper ends with said arms, said arms providing substantially continuous clearance between said bars, and said bars extending downwardly and forwardly in an arc and provided with terminal points projecting at least approximately horizontally, a reel having a shaft extending transversely of said frame and to which said bars are approximately concentric, a pair of links pivoted at least approximately coaxially with said reel shaft and extending rearwardly and downwardly therefrom, a roller rotatably carried by said links substantially immediately behind said bars and movable at least approximately concentrically at substantially uniform spacing behind said bars, means limiting the range of movement of said roller at least in one direction and at least one comb on said reel for coacting with said bars, said comb comprising teeth projecting from the reel toward the spaces between said bars.

16. The device of claim 1 in which the comb teeth are wider than the spaces between said bars and have reduced terminal portions entering such spaces.

17. The device of claim 1 in further combination with means for advancing the harvester, and means for concurrently rotating the reel at a rate such that its peripheral travel at least approximates the rate of harvester advance in a direction of rotation such that the comb teeth are approximately stationary respecting the surface traversed as they enter upon coaction with said bars.

18. The device of claim 1 in further combination with means for advancing the harvester, and means for concurrently rotating the reel at a rate such that its peripheral travel at least approximates the rate of harvester advance in a direction of rotation such that the comb teeth are approximately stationary respecting the surface traversed as they enter upon coaction with said bars, the reel being provided with a plurality of sets of comb teeth and the respective teeth being rearwardly inclined with respect to the direction of reel rotation.

19. The device of claim 1 in which the respective comb teeth are hingedly connected with the reel and provided with releasable detent means normally holding said teeth releasably in operative position, the respective teeth being foldable rearwardly upon encountering an overload.

JOSEPH F. SCHNEIDER.
BERNARD C. BRAZEAU.

REFERENCES CITED

The following references are of record in the file of this patent:

UNITED STATES PATENTS

| Number | Name | Date |
|---|---|---|
| 634,735 | Lane et al. | Oct. 10, 1899 |
| 649,377 | Waters | May 8, 1900 |
| 1,233,089 | Maglathlin | July 10, 1917 |
| 1,346,433 | Varland | July 13, 1920 |
| 1,452,629 | Veeder | Apr. 24, 1923 |
| 1,622,117 | Jenkins | Mar. 22, 1927 |
| 1,907,467 | Tervo et al. | May 9, 1933 |

FOREIGN PATENTS

| Number | Country | Date |
|---|---|---|
| 18,973 | Great Britain | 1895 |